United States Patent
Haussler et al.

(10) Patent No.: US 8,149,266 B2
(45) Date of Patent: Apr. 3, 2012

(54) HOLOGRAPHIC RECONSTRUCTION SYSTEM HAVING AN ENLARGED VISIBILITY REGION

(75) Inventors: Ralf Haussler, Dresden (DE); Joachim Gantz, Dresden (DE)

(73) Assignee: Seereal Technologies S.A., Munsbach (LU)

( * ) Notice: Subject to any disclaimer, the term of this patent is extended or adjusted under 35 U.S.C. 154(b) by 412 days.

(21) Appl. No.: 12/376,011

(22) PCT Filed: Aug. 3, 2007

(86) PCT No.: PCT/EP2007/058097
§ 371 (c)(1),
(2), (4) Date: Oct. 6, 2009

(87) PCT Pub. No.: WO2008/015283
PCT Pub. Date: Feb. 7, 2008

(65) Prior Publication Data
US 2010/0045775 A1    Feb. 25, 2010

(30) Foreign Application Priority Data
Aug. 3, 2006 (DE) .......................... 10 2006 036 255

(51) Int. Cl.
*H04N 5/89* (2006.01)
*G03H 1/00* (2006.01)

(52) U.S. Cl. .............................................. 348/40; 359/1
(58) Field of Classification Search ....................... None
See application file for complete search history.

(56) References Cited

U.S. PATENT DOCUMENTS

| 3,985,419 A | 10/1976 | Matsumoto et al. |
| 5,521,724 A | 5/1996 | Shires |
| 2003/0151821 A1 | 8/2003 | Favalora et al. |

OTHER PUBLICATIONS

International Search Report, dated Nov. 16, 2007, issued in priority International Application No. PCT/EP2007/058097.

*Primary Examiner* — Joseph Ustaris
*Assistant Examiner* — Frederick Bailey
(74) *Attorney, Agent, or Firm* — Saul Ewing LLP (57) ABSTRACT

The invention relates to a holographic reconstruction system for the reconstruction of scenes having at least one video hologram modulated wave front, and an enlarged visibility region. The system utilizes two-dimensional coded light modulator cells of spatial light modulation means and optical focusing means, which realize a Fourier transformation of the modulated wave front in their focal plane. First optical deflection means deflect the parallel disposed partial light waves such that their Fourier transformations appear as cascading in the focal plane. A spatial frequency filter located on the focal plane, lets each of the same diffraction orders of all modulated partial light waves pass, and second optical deflection means arrange the wave front strips next to each other at the modulated wave front, which reconstructs the scene.

24 Claims, 6 Drawing Sheets

HOLOGRAPHIC RECONSTRUCTION SYSTEM HAVING AN ENLARGED VISIBILITY REGION

CROSS REFERENCE TO RELATED APPLICATIONS

This application claims the priority of PCT/EP2007/058097, filed on Aug. 3, 2007, which claims priority to DE 10 2006 036255.1, filed Aug. 3, 2006, the entire contents of which are hereby incorporated in total by reference.

BACKGROUND OF THE INVENTION

The present invention relates to a holographic reconstruction system for the reconstruction of scenes, said holographic reconstruction system having an enlarged visibility region and illuminating two-dimensionally encoded light modulator cells of spatial light modulator means with coherent light.

FIELD OF THE INVENTION

The invention can be applied to a holographic reconstruction system, for example of the type of a holographic projection device as disclosed by the applicant in the international publication WO 2006/119760, titled "PROJECTION DEVICE AND METHOD FOR HOLOGRAPHIC RECONSTRUCTION OF SCENES".

The projection device preferably comprises in addition to a light modulator with a modulator surface of a cell matrix, light modulator cells and an illumination device for emitting coherent light, an imaging system with a first and a second imaging means. The first imaging means images the light modulator in an enlarged manner onto the second imaging means. The second imaging means images the spatial frequency spectrum, the Fourier spectrum of the light modulator, into a visibility region. The visibility region is thus the image of the used diffraction order in the Fourier plane of the video hologram. In order for the first imaging means to be able to image the entire light modulator onto the second imaging means, all contributions of a desired diffraction order must be covered by the first imaging means. This is achieved by focussing the modulated light on the first imaging means in which the spatial frequency spectrum is created. For this, the light modulator is illuminated by a wave which converges in the direction of light propagation. The first imaging means thus lies in the spatial frequency spectrum of the video hologram. Together with the observer window, the second imaging means defines a reconstruction volume. A scene is reconstructed in this reconstruction volume. The reconstruction volume also continues backwards to any extent beyond the second imaging means. The observer is thus able to see the reconstructed scene in the reconstruction volume through the observer window.

Light which is capable of generating interference typically illuminates two-dimensional spatial light modulator means in order to present video holograms.

A method for the holographic reconstruction with an enlarged visibility region is described in document Mishina T., Okui M., Okana F.: "Viewing zone enlargement method for sampled hologram that uses high-order diffraction", Applied Optics, Vol. 4, No. 8, p. 1489-1499. A light source illuminates a light modulator in which a hologram is encoded. A lens creates a Fourier plane of the hologram, and a spatial frequency filter in the form of an aperture mask filters out diffraction orders from the Fourier plane. The aperture mask has an aperture pattern, which can be controlled temporally and spatially, and through which multiple diffraction orders of the Fourier transform of the hologram can be transmitted sequentially and be strung together such that the reproduced image—the reconstructed three-dimensional object—can be seen by the observer in an enlarged visibility region.

A problem is that for enlarging the visibility region the multiple diffraction orders having different intensities are filtered and joined sequentially. For this, the filter requires controllable openings in the Fourier plane of the hologram. Because the intensity of the diffraction orders in the visibility region differs, the intensity of the illuminating light must be controlled sequentially as well. Further, extensive software means are required, e.g. for switching and controlling the apertures. The sequential representation of the hologram and the filtering process must be performed at sufficient speed, so to prevent the reconstructed image from flickering.

SUMMARY OF THE INVENTION

The present invention is based on a holographic reconstruction system for the reconstruction of scenes, where optical focussing means track a light wave front modulated by a video hologram to at least one eye position of an observer eye in a visibility region. Light which is capable of generating interference illuminates a two-dimensionally encoded modulator cell matrix of spatial light modulator means and thus modulates the light wave front. The modulator cells of the modulator cell matrix are arranged in modulator cell rows and modulator cell columns. Because it is irrelevant to the functionality of the present invention whether encoding means encode the modulator cell matrix structured in modulator cell rows or in modulator cell columns, the term 'cell rows' will be used for the arrangement of the encoded cell structure.

When the modulated wave front propagates on to the eye position, the optical focussing means perform an optical Fourier transformation of the modulated wave front in its focal plane, such that a Fourier transform of the modulated light wave front is created in the Fourier plane.

It is the object of the present invention to provide technical means which enlarge the visibility region optically in an inexpensive manner. When modulating the light wave front, which reconstructs a three-dimensional scene, the effective number of cells in one dimension shall in particular be multiplied in comparison to the respective number of cells in that dimension of the modulator matrix.

This is achieved in the holographic reconstruction system according to this invention by using a specific method of encoding the spatial light modulator means for modulating the light front which is capable of generating interference in conjunction with a spatial division of the light wave front, deflection and spatial filtering of the divided light wave front.

According to this invention, hologram computation means associate the information of the total light wave front which is required for the holographic reconstruction to multiple wave front strips, and compute for each video hologram of the video sequence strip holograms which comprise multiple hologram segments.

The hologram computation means are connected to encoding means which encode the spatial light modulator means using a combination of both time division multiplexing and spatial division multiplexing modes. The encoding means encode the spatial light modulator means with the content of a strip hologram in the time division multiplex mode and with its hologram segments in the spatial division multiplex mode. All hologram segments of each strip hologram together have such a number of hologram pixels that the strip holograms are disposed side by side in cell rows on the modulator cell matrix as spatial division multiplex structure of the corresponding hologram segments.

As a result of the illumination of the modulator cell matrix with a light wave front which is capable of generating interference, the modulator cell matrix modulates partial light waves propagating parallel which comprise the information of a hologram segment and which are assigned to a strip hologram.

To solve the object of the present invention, the following elements are disposed in the light path of the light wave front, in addition to the modulator cell matrix and the focussing means:

First optical deflection means which deflect the partial light waves propagating parallel of the modulated wave front in different directions such that their Fourier transforms appear in a step-like manner in the focal plane, A spatial frequency filter which lies in a focal plane of the focussing means and which lets pass the same diffraction order of all modulated partial light waves, Second optical deflection means which string together the passing diffraction orders of the partial light waves so to form a wave front strip, A time division multiplex control system, which works in synchronism with the time division multiplex mode of the hologram computation means, and which discretely adjusts adjustable third optical deflection means such that these deflection means dispose the wave front strips side by side, such that the modulated wave front appears and all wave front strips holographically reconstruct the desired scene in the time division multiplex mode.

In other words, all hologram segments which are encoded during a signal frame of the video signal belong to one strip hologram and modulate partial light waves, propagating parallel, of a wave front strip with the hologram segments. The modulator cell matrix modulates the remaining strip holograms by way of time division multiplexing, such that the strip holograms holographically reconstruct the scene by way of time division multiplexing.

It is a known disadvantage that the cell structure of the modulator cell matrix modulates in addition to a desired diffraction order parasitic diffraction orders, for which a Fourier transformation is performed by the optical focussing means. The Fourier transformation causes a spatial frequency spectrum to be generated in the focal plane of the focussing means for each partial light wave.

In order to optically enlarge the visibility region according to the object of this invention, first optical deflection means laterally deflect the partial light waves of a strip hologram in one dimension such that the partial light waves appear in a step-like offset manner in the focal plane of the optical focussing means. These deflection means have static angle settings. This has the advantage that a simple spatial frequency filter with a step-like structure of fix apertures can be used in order to separate with high efficiency the same respective diffraction order, which is desired for reconstructing, of each modulated partial light wave from the disturbing parasitic diffraction orders.

Second optical deflection means string together the passing diffraction orders of all modulated partial light waves such that a modulated light wave strip is generated, which is made up of the joined partial light waves. The second optical deflection means thus compensate the optical deflection of the partial light waves which are organised in a spatial division multiplex process in order to make up for the spatial multiplexing.

As a result of the lateral deflection in one dimension, this modulated light wave strip exhibits a hologram pixel resolution which is a multiple of the number of the hologram segments. A multiplication of the diffraction angle of the modulator cell matrix is thus achieved in one dimension of the modulator cell matrix, which corresponds to an enlargement of the visibility region according to the object of the present invention.

The first optical deflection means can be a prism array which is disposed in the optical path of the wave front and which displaces the modulated partial light waves in one dimension, i.e. horizontally or vertically against one other, such that the modulated partial light waves are disposed side by side in the focal plane of the focussing means in a step-like manner and offset by one diffraction order.

The encoding means preferably assign each hologram segment on the cell structure of the modulator cell matrix with multiple adjacent horizontal modulator cell rows, such that only few, for example three, hologram segments lie on the modulator cell matrix. According to the number of hologram segments, the first optical deflection means comprise multiple, for example three, prisms which stretch entirely across the modulator cell matrix in one dimension. The longitudinal sides of the prisms adjoin to one another, and the prisms exhibit different inclinations. The inclinations are chosen such that the same diffraction orders of the adjacent partial light waves are adjoined in the focal plane after the deflection such that a seamless connection of the step-like offset same diffraction orders is achieved. This can be achieved if the maximum diffraction angle of the light modulator means in the direction of deflection defines the inclinations of the prisms.

According to a preferred embodiment of this invention, the first optical deflection means can be a prism array with micro prisms, where each matrix section is assigned with a multitude of micro prisms, which direct the partial light waves in a step-like manner according to the structure of the spatial frequency filter. This facilitates a more light-weight design of the projection system and reduces the volume of the hologram projector.

The spatial frequency filter may preferably be an aperture mask with apertures each of which letting pass a single diffraction order of the modulated partial light wave. However, a different mask with transparent and light-impermeable areas, for example a photographic film copy or the like, can be used instead of an aperture mask. This mask then comprises step-like offset transparent areas which correspond to the form and position of the same diffraction orders in the plane where the spatial frequency filter is disposed.

The second optical deflection means is also a prism array. The prisms lie in the optical path in order to string together the modulated, filtered and step-like offset partial light waves in one dimension so to form one light wave strip.

The second optical deflection means are preferably also micro prisms, a multitude of which being assigned to each matrix section. These micro prisms can also be adjusted as regards their angular range and be connected to a position controller which is adjusted by an eye finder such that the light wave strips with their partial light waves are directed according to an eye position. This way, if the adjustable optical deflection means are enlarged, the modulated partial light waves can be tracked at least in one dimension according to the changes of eye positions.

In order to save room inside the device, the second optical deflection means can be disposed directly on the spatial frequency filter.

The discretely adjustable third optical deflection means are well known from beam-projection display devices. Such a device has movable mirrors or rotating polygonal mirrors for reproducing an image on a display surface, and deflects the light for example row by row. The international publication WO 2006053793, titled "BEAM-PROJECTION DISPLAY DEVICE AND METHOD FOR OPERATING A BEAM-PROJECTION DISPLAY DEVICE" may be referred to as an example. The third optical deflection means can also be controllable micro prisms.

It appears to a person skilled in the art, that it is not relevant for the practical embodiment of this invention whether the modulator cells of each cell row are disposed horizontally or vertically.

Considering this, the visibility region can for example be broadened in the spatial division multiplex mode by horizontally stringing together multiple hologram segments, i.e. by increasing the horizontal resolution. In this context, the hologram computation means can compute a larger number of strip holograms for each video hologram in order to increase with the help of the encoding means the vertical resolution in the time division multiplex mode.

If the holographic reconstruction system exhibits such a structure, micro prisms in the second deflection means which are adjustable as regards their angular range and which are connected to a position controller, can direct the generated modulated light wave strips in accordance with horizontal changes of the eye position.

According to a preferred embodiment of the present invention, the focussing means exhibit horizontally and vertically different focal planes such that both a Fourier plane and an image plane can be created in the same plane. A focal plane is therein disposed as close as possible to the spatial frequency filter, such that a Fourier transform of the partial light waves appears on the spatial frequency filter in the direction of deflection of the first deflection means. The second focal plane lies such that the focussing means vertically project the illuminated modulator cell matrix on to the second deflection means.

In the present case, the focussing means realise in the horizontal direction a Fourier transformation of the modulated wave front near the spatial frequency filter, and in the vertical direction an imaging of the light modulator means near the second deflection means.

In a specific embodiment, the focussing means have a focal length $f_x$ in one direction and are disposed at that distance $f_x$ after the light modulator means, such that the Fourier transform of the partial light waves is generated on the spatial frequency filter at that distance $f_x$ after the focussing means, such that the diffraction orders of the modulated partial waves, which are emitted by the light modulator means at different angles, appear spatially separated on the spatial frequency filter.

The focussing means have for example a vertical focal length $f_y$, where $f_y=f_x/2$ and where the distances between the light modulator means and focussing means, and between the focussing means and the spatial frequency filter plane are $2f_y$. An image of the hologram segments on the modulator cell matrix then is generated in the spatial frequency filter plane.

SHORT DESCRIPTION OF FIGURES

The present invention will be described in more detail below with the help of a number of embodiments and drawings, wherein.

DETAILED DESCRIPTION OF THE INVENTION

Figure 1:
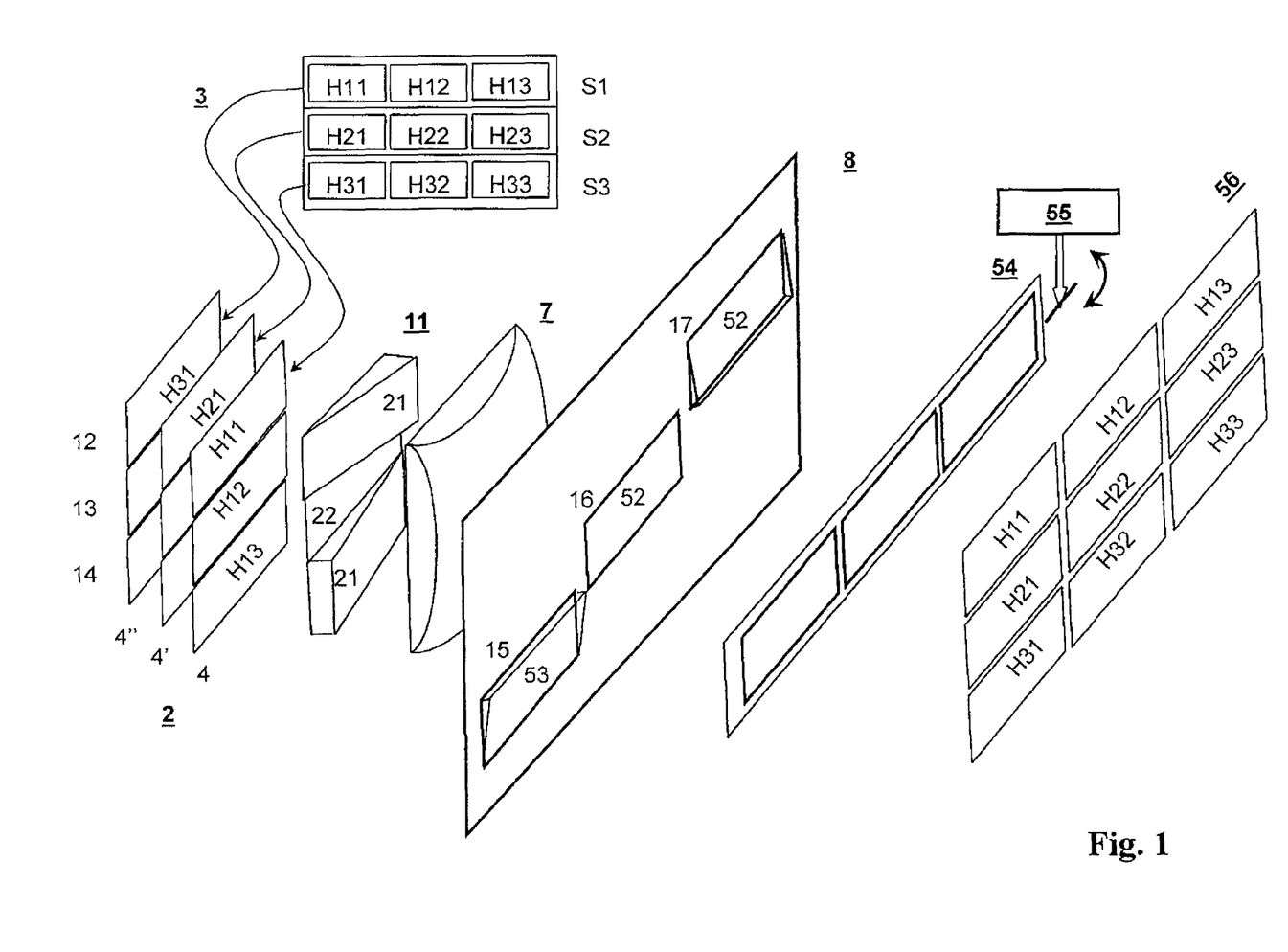
FIG. 1 is a perspective view of a part of the holographic reconstruction system according to the present invention.

FIG. 1 illustrates a detail of a holographic reconstruction system 1 for the holographic reconstruction of scenes with a light modulator 2 on which a sequence of video holograms is encoded. Light which is capable of generating interference (not shown) illuminates the modulator cell matrix 4 of a spatial light modulator 2 with m modulator cell rows at n modulator cells each, focussing means, here in the form of a lens 7, and a spatial frequency filter 8.

According to the present invention, a first optical deflection means, here in the form of a prism array 11, is disposed between the light modulator 2 and the lens 7. Hologram computation means 3 compute for each video hologram strip holograms S1 ... S3 with hologram segments H11 ... H33. An encoding device (not shown) encodes one after another the modulator cell matrix 4 with hologram segments of the strip holograms S1 ... S3. FIG. 1 thus shows different sequentially encoded modulator cell matrices 4, 4' and 4" in assigned cell regions 12, 13, 14 with the hologram segments H11 ... H33, the horizontally deflecting static prism array 11, focussing means in the form of a lens 7 and a spatial frequency filter in the form of an aperture mask 8 with attached second optical deflection means, the vertically deflecting prisms 51, 52 and 53. The prism array 11 realises a horizontal, step-like displacement 9 of the partial light waves which are modulated by the cell regions 12, 13, 14. The aperture mask 8 has step-like offset openings 15, 16, 17 which are disposed below the prisms 51, 52, 53 and which filter only one chosen diffraction order out of the Fourier transform of the partial light waves of the hologram segments. The prisms 51, 52 and 53 vertically deflect the filtered partial light waves such that the latter hit a third deflection device 54, which can be pivoted around a horizontal axis, such that the hologram segments of each strip hologram S1, S2 or S3 appear one after another as light wave strips. The deflection device 54 is synchronised by a time division multiplex controller 55 with the time multiplex mode of the hologram computation means, such that an entirely modulated light wave front with the structure and modulation of all strip holograms S1 . . . S3 is made available for a holographic reconstruction through an exit pupil 56.

Figure 2:
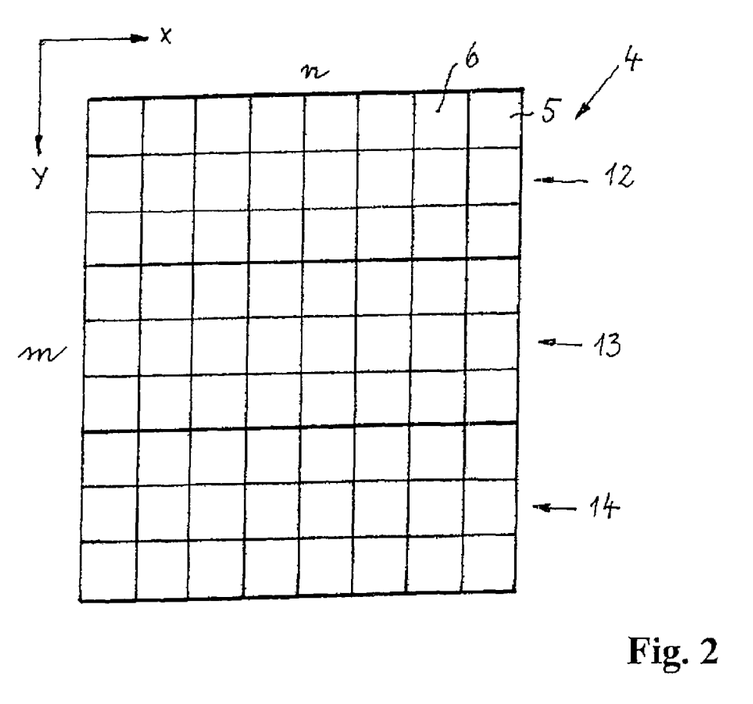
FIG. 2 is a schematic view of a modulator cell matrix of spatial light modulator means.

FIG. 2 shows the modulator cell matrix 4 of the light modulator 2, which exhibits n modulator cells 6 and m cell columns 5 in a cell row, where, in the present case, three cell columns 5 form one cell row 12, 13, 14.

Figure 3:
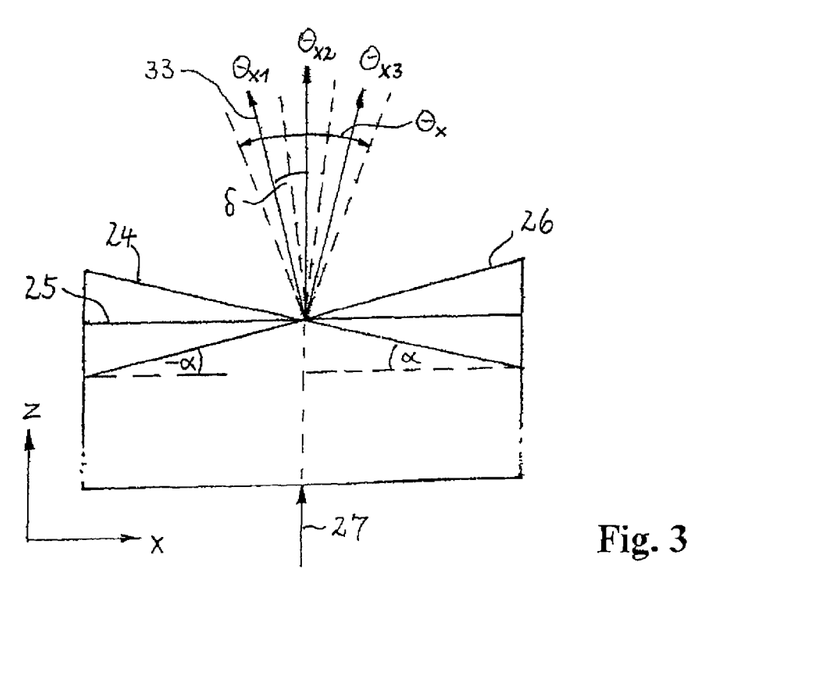
FIG. 3 shows an example of a deflection means in the form of a prism array in a projection system according to the present invention.
Figure 4:
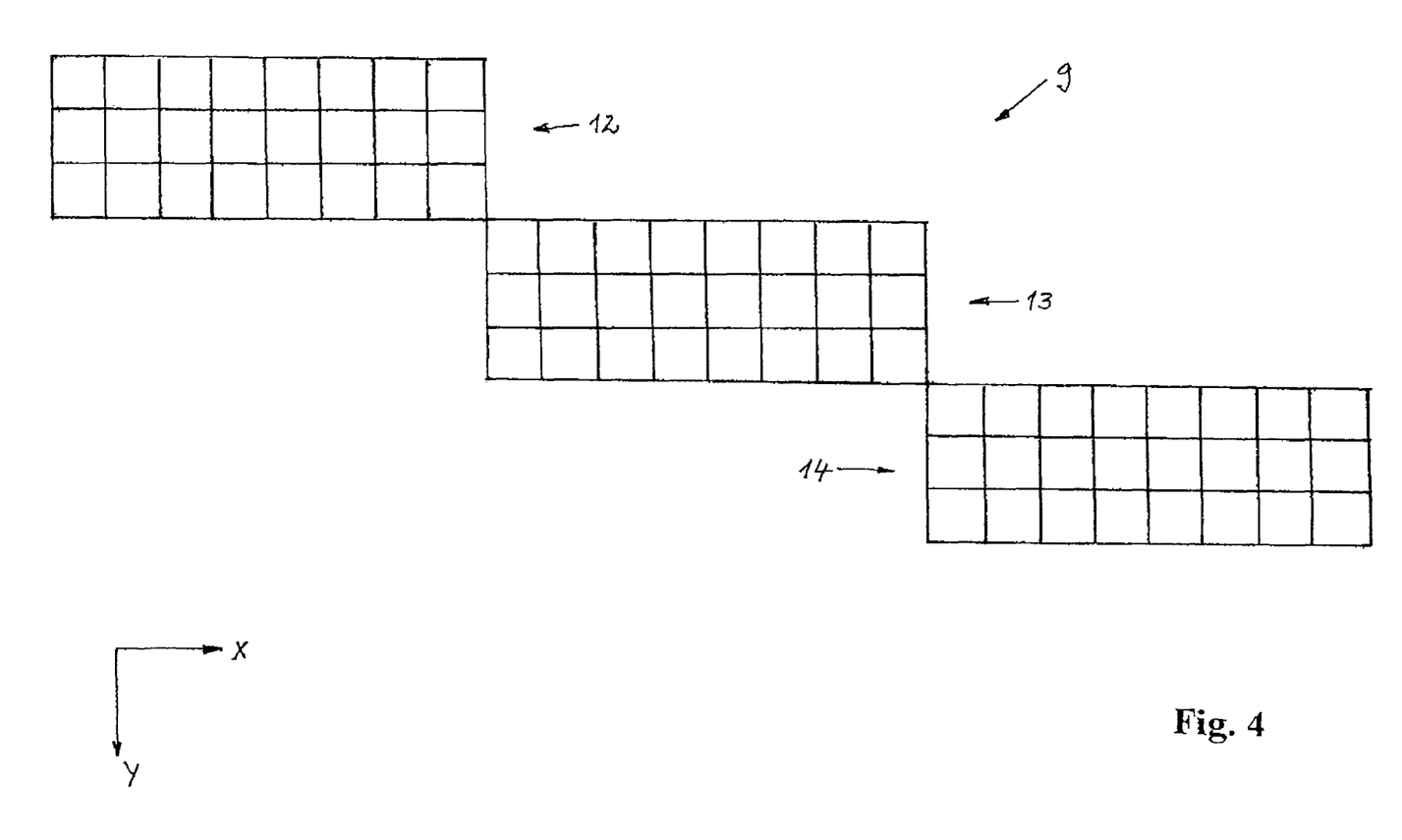
FIG. 4 is an example of the step-like offset of the modulated partial light waves with the help of the prism array according to FIG. 3.

As shown in FIG. 3, the prism array 11 comprises three prisms 21, 22, 23, which are disposed side by side vertically, and which exhibit different inclinations 24, 25, 26 with different inclination angles $-\alpha$, $0°$, $+\alpha$, said inclinations 24, 25, 26 being chosen such that the corresponding diffraction angle ranges $\Theta_{x1}$, $\Theta_{x2}$, $\Theta_{x3}$ of adjacent prisms 21, 22, 23 are adjoined such that horizontally a seamless connection of the step-like offset 9 of the modulator rows 12, 13, 14 can be achieved, as shown in FIG. 4.

The maximum number of the adjoined diffraction angle ranges corresponds to the number m of the cell rows 5 into which the light modulator 2 is structured during the encoding process. However, the prism array 11 would comprise very many very narrow prisms, and the subsequently disposed movable deflection means would have to position very finely. The narrow prisms would be prone to great diffraction effects. It is therefore sensible not to adjoin the maximum number of angular ranges that corresponds with the number m of cell rows 5.

In FIG. 1, for example, only three prisms 21, 22, 23 are thus used, i.e. each prism 21, 22 and 23 is assigned with one third of the cell rows 5, where that third may then be a modulator row 12 or, as will be explained below, may comprise a hologram.

The maximum horizontal diffraction angle of the light modulator 2 defines the diffraction angle ranges $\Theta_{x1}$, $\Theta_{x2}$, $\Theta_{x3}$ of the prisms 21, 22, 23.

As shown in FIG. 3, the light modulator 2 with a cell pitch of 10 µm exhibits a maximum diffraction angle $\Theta_x$ of $3.6°$ at a wavelength $\lambda$ of 633 nm. The value of $3.6°$ also represents the angular range of a diffraction order. In order to also select the corresponding diffraction order of an adjacent partial light wave, the adjacent prism 24 or 26 must deflect the light by $+3.6°$ or $-3.6°$, respectively.

FIG. 3 shows the prism 21 with an incident partial light wave 27 and the modulated partial light wave 33 which is deflected by the angle $\delta$. The prism angle is the angle $\alpha$ of the inclination 24. A partial light wave 27 which enters the lower face of the prism 21 is deflected by the angle $\alpha$ when it exits the upper face. The relation between $\alpha$ and $\delta$ is given as $\delta = \arcsin(n^*\sin\alpha) - \alpha$ (I), where n is the refractive index of the prism 21. For small angles $\alpha$, the linear approximation $\delta \approx (n-1)^*\alpha$ can be derived from equation (I).

Given a refractive index n of 1.5, a prism angle $\alpha$ of $7.2°$ is thus required in order to deflect an incident partial wave 27 by $3.6°$. Because according to the linear approximation the deflection angle $\delta$ does not depend on the angle of incidence on the lower face of the prism, the angular range of one diffraction order is deflected by $3.6°$. If the central prism 22 has a prism angle of $0°$, according to the above-mentioned linear approximation, the adjacent prisms 21 and 23 must have prism angles of $+7.2°$ and $-7.2°$, respectively, and the next but one prism must have prism angles of $+14.4°$ and $-14.4°$, respectively.

In contrast to FIG. 1, where the prism array 11 is disposed behind the light modulator 2, it is also possible to dispose the prism array 11 in front of the light modulator 2.

The combined arrangement of light modulator 2 and prism array 11 can also be considered as a single-row light modulator with n*m cells, where one row comprises n*k cells. The prism array 11 is therein used for spatial division multiplexing, i.e. the hologram segments H11, H12, H13, which correspond to the adjoined angular ranges $\Theta_{x1}$, $\Theta_{x2}$, $\Theta_{x3}$, are encoded simultaneously, but spatially separated on the light modulator 2.

The maximum diffraction angle $\Theta_x$ of the light modulator 2 is $\lambda/p$, where p is the cell pitch of the light modulator 2 and $\lambda$ is the wavelength of the incident light. The maximum diffraction angle $\Theta_x$ also limits a diffraction order. In one diffraction order, the diffraction pattern can be controlled by encoding the light modulator 2. The diffraction pattern is repeated in higher diffraction orders. The higher diffraction orders adjoin the angular range $\Theta_x$ of the zeroth diffraction order on both sides.

The spatial frequency filter according to this invention prevents parasitic diffraction orders from entering the used diffraction orders of the partial light waves of the prisms 21, 22 and 23. This is important because a parasitic diffraction order is only a periodic continuation of the used diffraction order, and parasitic diffraction orders which enter the visibility region would substantially disturb the holographic reconstruction. This is why the spatial frequency filter may only let pass the used diffraction order of the partial wave front, which is divided by each prism 21, 22, 23.

Figures 5, 5A, 5B:
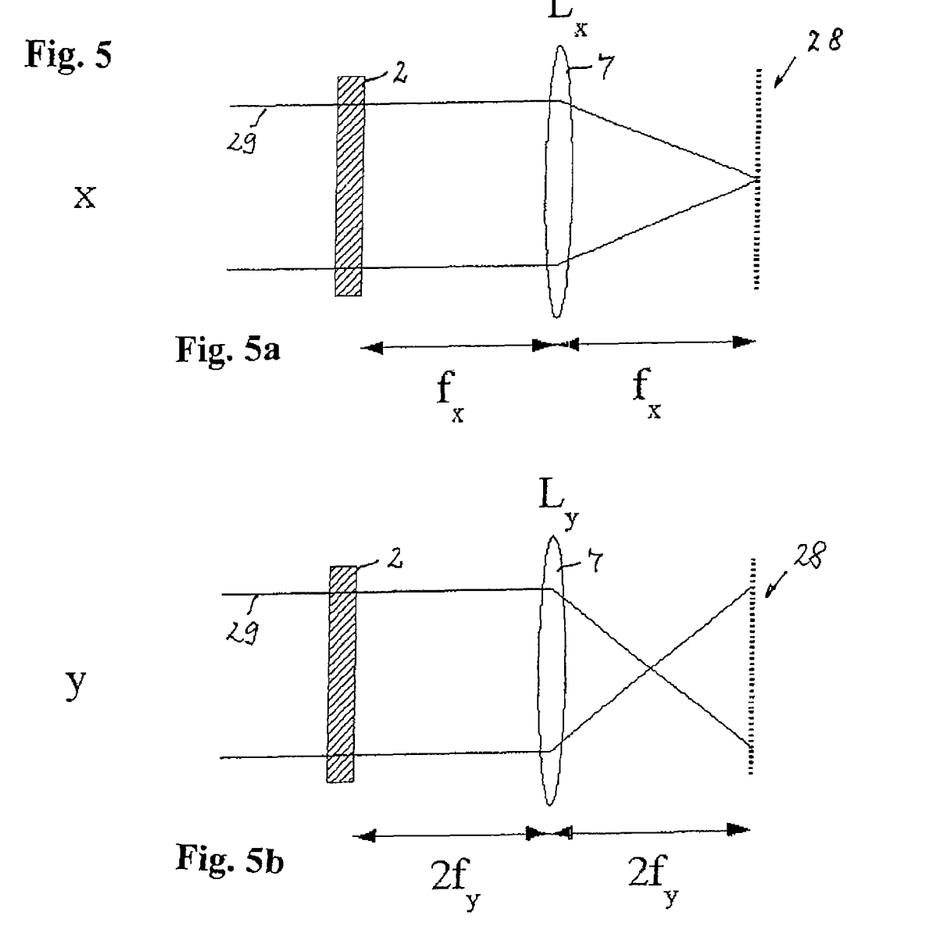
FIG. 5 is a schematic view illustrating the function of the focussing means, where
FIG. 5a is a top view of the modulated and Fourier-transformed wave front and FIG. 5b is a side view of the wave front which images the video hologram in the vertical direction into a plane.
Figure 6:
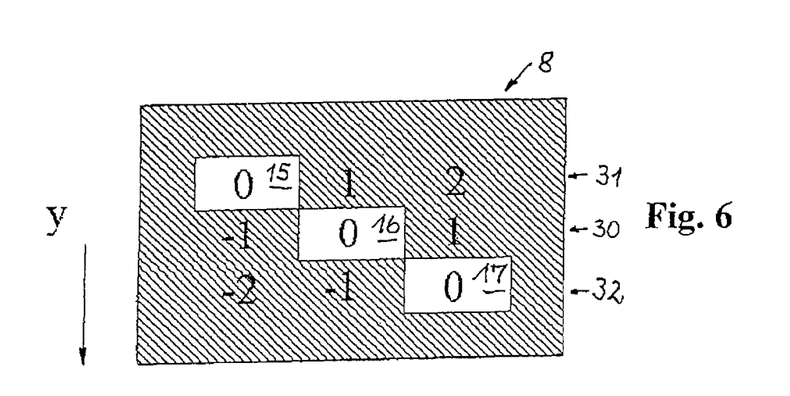
FIG. 6 illustrates the structure of the spatial frequency filter.

One possibility for this is shown in FIG. 5 with FIG. 5a and FIG. 5b in combination with FIG. 6. The focussing means which lie in the optical path, and which are illustrated as lens 7 here, exhibit vertically and horizontally different focal planes. It is thus achieved that both a Fourier transform of the video hologram and an imaging of the light modulator are disposed in the same plane 28. This means that the Fourier plane is identical to the image plane.

FIG. 5a is a side view. The lens 7 ($L_x$) is disposed behind the illuminated light modulator 2. That lens has the focal length $f_x$ in the horizontal direction and is disposed behind the light modulator 2 at that distance $f_x$. A Fourier transform of the modulated light wave front is generated in the horizontal direction in the filter plane 28 at the distance $f_x$ behind the lens 7. The diffraction orders which, starting from the light modulator 2, run at different angles are spatially separated in the filter plane 28 as a result of the Fourier transformation.

FIG. 5b is a side view. The lens 7 has the vertical focal length $f_y$, where $f_y=f_x/2$. The distance of $2f_y$ both between the light modulator 2 and the lens 7, and between the lens 7 and the filter plane 28, causes the holograms segments on the light modulator to be projected vertically into the filter plane 28.

Because the filter plane 28 is a Fourier plane horizontally and an image plane vertically, the spatial frequency filter 8 is disposed in the filter plane 28 in the present invention. This is shown in FIG. 6. The numbers entered on the spatial frequency filter 8 describe the diffraction orders of the Fourier transforms. In the Figure, the central section 30 of the spatial frequency filter 8 comprises the $-1^{st}$, $0^{th}$ and $1^{st}$ diffraction order of a prism 22. In the upper segment 31, the diffraction orders of the adjacent prism 21 are displaced to the left by one diffraction order, because the angle of the prism 21 is chosen such that there is a deflection by one diffraction order. The same applies to the lower section 32, which corresponds to the prism 23, but with an offset by one diffraction order to the right. Because the vertical and horizontal focal lengths of the lens 7 differ, a Fourier transform of the light wave front lies in the filter plane 28 and the diffraction orders are spatially separated while the lens 7 images the encoded light modulator 2 vertically.

The spatial frequency filter 8 exhibits openings 15, 16, 17, which only let pass the selected diffraction order of each hologram segment 12, 13, 14. This results in a structure of step-like offset rectangular apertures 15, 16, 17, and the selected diffraction orders of the hologram segments are adjoined while the spatial frequency filter 8 absorbs all undesired diffraction orders. This prevents mutual interference of the various diffraction orders. The horizontally adjoined selected diffraction orders multiply the diffraction angle of a light modulator 2.

FIG. 6 illustrates a step-like offset of the adjoined angular ranges $\Theta_{x1}$, $\Theta_{x2}$, $\Theta_{x3}$. Whether or not the offset 9 must be compensated in the vertical direction, and how this is done, depends on the subsequent optical arrangement or a subsequent optical system, according to the intended use of the device. The light filtered in the filter plane 28 can be directed into a subsequent optical arrangement, as shown in FIGS. 7, 8 and 9, e.g. for a holographic illumination device or for a holographic projection system.

Figure 7:
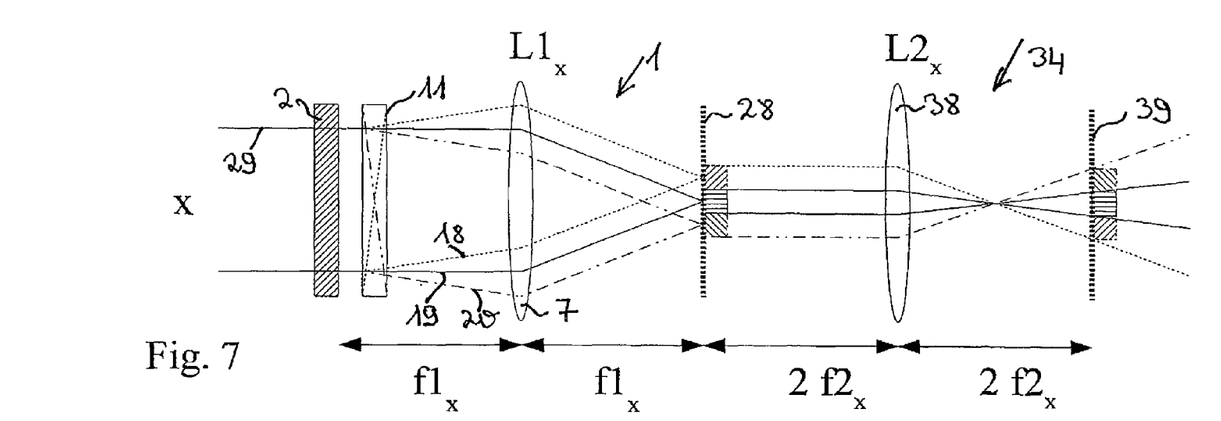
FIG. 7 is a schematic view showing a side view of the optical path of a device according to the present invention.

FIG. 7 is a side view of the device 1 according to this invention for adjoining diffraction orders of an encoded light modulator 2 for use in a subsequent arrangement 34. The compensation of the step-like offset 9 with a deflection device 40 in the form of a one-dimensional diffuser is shown in FIG. 8. In the embodiment, the prism array 11, which comprises the three prisms 21, 22, 23, is disposed behind the light modulator 2. The drawn bundles of rays 18, 19, 20 represent the selected diffraction orders of the prism 21, prism 22 and prism 23. The used diffraction orders of the partial light waves are offset as regards their angles $\Theta_{x1}$, $\Theta_{x2}$, $\Theta_{x3}$, and are thus spatially separated in the filter plane 28 behind the lens 7. A lens 38 horizontally images the filter plane 28 into an exit plane 39. This is why the diffraction orders, which are spatially separated in the filter plane 28, are spatially separated there again. The prisms 21, 22, 23 of the prism array 11 horizontally direct the modulated bundles of rays 18, 19, 20 into different adjacent angular ranges $\Theta_{x1}$, $\Theta_{x2}$, $\Theta_{x3}$. The diffraction angle range $\Theta_x = \Theta_{x1} + \Theta_{x2} + \Theta_{x3}$ of the light modulator 2 is thus enlarged in the horizontal direction.

Figure 8:
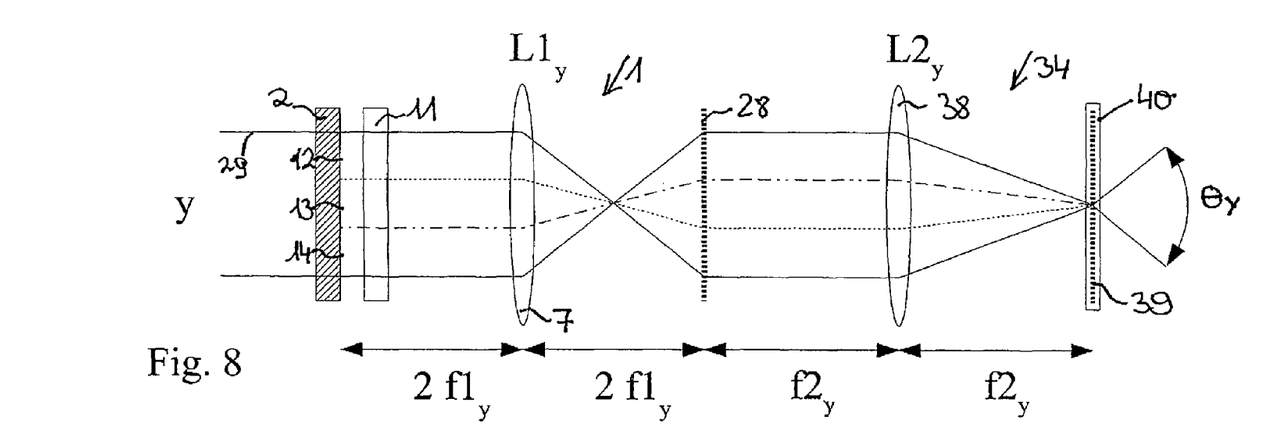
FIG. 8 is a top view of the device according to this invention with a one-dimensional diffuser.
Figure 9:
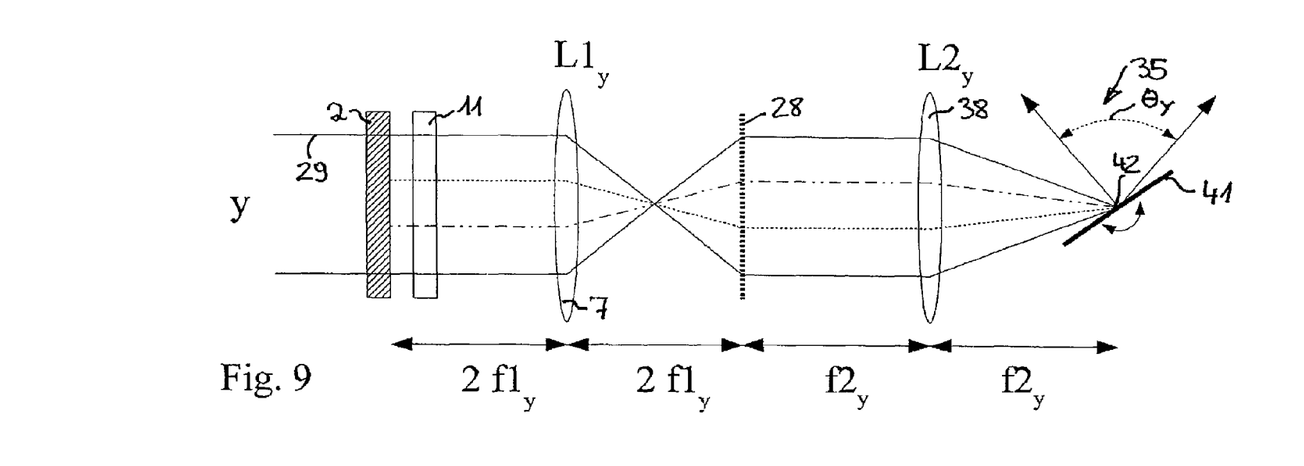
FIG. 9 is a side view of one embodiment of the device according to this invention according to FIG. 7 with an adjustable third optical deflection means in the form of a rotating mirror having a rotation axis.

FIG. 8 is the corresponding side view. The prism array 11, which vertically deflects the light waves, is disposed behind the light modulator 2. The lens 7 images the prisms 21, 22, 23 into the filter plane 28, where the spatial frequency filter 8 is disposed. The lens 38 vertically realises a Fourier transformation into the exit plane 39, where the Fourier transforms of the partial light waves lie. However, the modulated light of the hologram segments runs into different angular ranges $\Theta_{y1}$, $\Theta_{y2}$, $\Theta_{y3}$.

Figure 10:
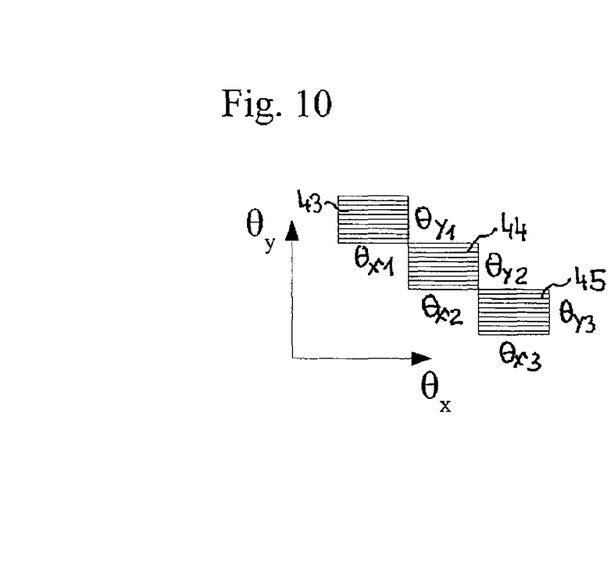
FIG. 10 shows the graph of the desired diffraction orders for the modulated partial light waves.

Because in the horizontal direction the light is radiated into different angular ranges $\Theta_{x1}$, $\Theta_{x2}$, $\Theta_{x3}$, only an offset total angular range $(\Theta_x, \Theta_y)$ as shown in FIG. 10 can be covered. The individual angular ranges 43, 44, 45 with $\Theta_{x1}$, $\Theta_{y1}$; $\Theta_{x2}$, $\Theta_{y2}$; $\Theta_{x3}$, $\Theta_{y3}$ are adjoined in a step-like offset manner. As shown in FIG. 8, a one-dimensional diffuser 40 which acts in the vertical direction diffuses the light in the arrangement 34, and so a continuous angular coverage is achieved over a total angular range $\Theta_y$ of at least $\Theta_{y1} + \Theta_{y2} + \Theta_{y3}$.

If the encoded information of the light modulator 2 is constant in the vertical direction, the vertical diffuser 40 will be sufficient for compensating the offset 9, where, however, any vertical information will be lost. This is why only a horizontal diffraction pattern with horizontal structure can be used, such as a sequence of parallel lines in the vertical direction. Such a projection device can serve in a holographic reconstruction device to realise a backlight with virtual light sources. In this case, the light modulator 2 is encoded with a computer-generated hologram which reconstructs light points or light lines which serve to illuminate a second light modulator on which the video hologram is encoded.

However, if the projection system is provided primary for generating a holographic reconstruction, a one-dimensionally deflecting rotating mirror 41 will be required instead of the one-dimensional diffuser 40, as shown in FIG. 9. The rotating mirror 41 deflects the light of the light modulator 2 in the vertical direction. The arrangement 35 is more flexible than that with the one-dimensional diffuser 40, because the light modulator 2 is encoded with a new strip hologram while the rotating mirror 41 is in motion. Thereby, a visibility region is generated which comprises sub-regions which are adjoined vertically in a step-like manner. It thus becomes possible to structure and enlarge the visibility region in the vertical direction as well.

Because the Fourier transformation with the help of the lens 38 also produces vertical parasitic diffraction orders, these parasitic diffraction orders must be blocked by a horizontal aperture gap filter in the exit plane 39 (not shown). The top view is the same as shown in FIG. 7.

The rotating mirror 41 disposed in the exit plane 39 (not shown) has a horizontal rotation axis 42. The beams from the angular ranges 43, 44, 45 are thus deflected vertically.

FIG. 10 shows the angular ranges 43, 44, 45, which are covered if the mirror is not in motion. Horizontally, the angular ranges of the used diffraction order are adjoined. Vertically, encoding the modulated cells in adjacent modulator rows 12, 13, 14 causes step-like offset angular ranges 43, 44, 45 to appear in the filter plane 28. This is why no rectangular angular range, which would be parallel to the axes of the coordinate system, can be covered if the rotating mirror 41 is at a fix position.

Figure 11:
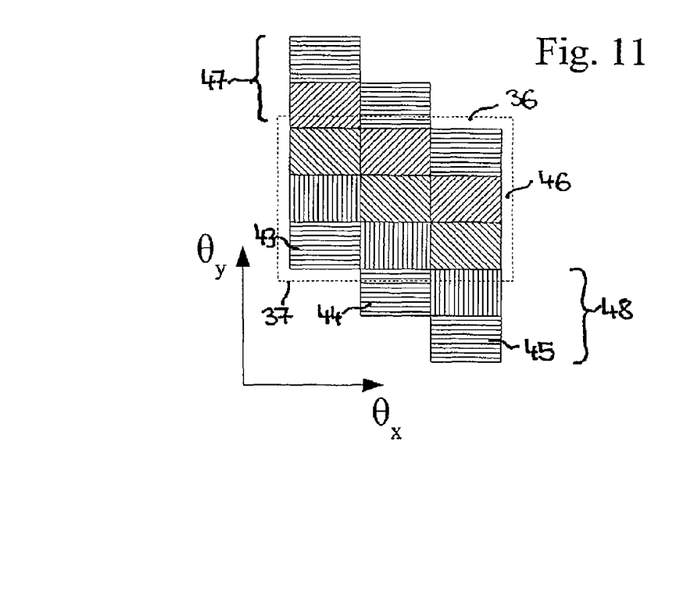
FIG. 11 illustrates a deflection pattern generated when rotating the rotating mirror, with the modulated partial light waves which are deflected in vertical steps being arranged next to each other in rows.

FIG. 11 shows a deflection pattern when rotating the rotating mirror 41 with step-like offset angular ranges 43, 44, 45 in the vertical direction, where the angular ranges are seamlessly adjoined by the rotating mirror 41. The angular ranges 43, 44, 45 with same hatching are displayed simultaneously. If the light modulator 2 is re-encoded in synchronism with the movement of the rotating mirror, the hologram can also be structured in the vertical direction. The angular ranges with the same $\Theta_y$ and different $\Theta_x$ are generated at different times in the modulator, as can be seen in the Figure (different hatching). Thanks to the vertical deflection, a rectangular angular range 46 can be covered, which is shown as a dotted area in FIG. 11. The appendices 47, 48 at the upper 36 and lower edges 37 can be gated out or hidden through an empty light modulator content.

This is achieved when reconstructing the hologram 4 either by illuminating each sub-hologram 12, 13, 14, . . . of the light modulator 2 under different angles, where the illumination angle changes in steps which correspond to the maximum diffraction angle $\Theta_{x1}$, $\Theta_{x2}$, $\Theta_{x3}$, . . . , $\Theta_{xk}$ of a modulator row 12, 13, 14, . . . , or by illuminating them under a fix angle, e.g. in the normal direction (the z direction). The light of the hologram 4, which is diffracted by each sub-hologram 12, 13, 14, . . . , will then be deflected under an angle which is also step-wise enlarged according to the maximum diffraction angle $\Theta_{x1}$, $\Theta_{x2}$, $\Theta_{x3}$, . . . , $\Theta_{xk}$. Both variants can be realised e.g. with the light modulator 2 and the prisms 21, 22, 23, . . . which each cover a sub-hologram 12, 13, 14, . . . of the hologram 4. Their respective inclinations 24, 25, 26, . . . are enlarged in steps according to the diffraction angles $\Theta_{x1}$, $\Theta_{x2}$, $\Theta_{x3}$, . . . , $\Theta_{xk}$.

In contrast to prior art solutions, a major advantage of the present invention is that the spatial frequency filter is static, fitted with fix, localised openings in the mask, and that it works without a shutter device.

Depending on the application, the present invention makes it possible either to virtually enlarge the resolution of spatial light modulator means or to enlarge the visibility region for a holographic reconstruction.

The invention claimed is:

1. Holographic projection system for the reconstruction of scenes with at least one wave front modulated by video holograms, where light capable of generating interference illuminates a two-dimensional, encoded modulator cell matrix of spatial light modulator means, and where optical focussing means realise a Fourier transform of the modulated wave front in their focal plane, characterised in that Hologram computing means, which compute for each video hologram multiple strip holograms, each comprising multiple hologram segments, Encoding means, which encode the strip holograms in the time division multiplex mode and the hologram segments in the spatial division multiplex mode on the modulator cell matrix such that a wave front sequence modulated by the strip holograms is generated, which carry the modulation of the assigned hologram segments in partial light waves, propagating parallel First optical deflecting means which deflect the partial light waves propagating parallel such that their Fourier transforms appear in a step-like manner in the focal plane, A spatial frequency filter which lies in the focal plane and which lets pass the same diffraction order of all modulated partial light waves, Second optical deflection means which string together the passing diffraction orders of the partial light waves so to form a wave front strip, A time division multiplex controller which discretely controls adjustable third deflection means such that the third deflection means position the wave front strips side by side so to form the modulated wave front which reconstructs the scene.

2. Holographic projection system according to claim 1 where the encoding means encode the hologram segments of each strip hologram into adjacent matrix sections of the modulator cell matrix such that each strip hologram modulates a light wave, said light waves comprise in the partial light waves propagating parallel the modulation of the hologram segments of the strip hologram.

3. Holographic projection system according to claim 2 where each matrix section of the modulator cell matrix comprises at least one pixel row.

4. Holographic projection system according to claim 2 where the first optical deflection means is a prism array with prisms which lie in the optical path of the modulated partial light waves, where the matrix sections are assigned with prisms which have respective inclinations, such that these inclinations offset the modulated partial light waves in one dimension always by the length of one diffraction order such that same diffraction orders of adjacent partial light waves are seamlessly adjoined.

5. Holographic projection system according to claim 4 where the maximum diffraction angle of the light modulator means in the direction of deflection defines the inclinations of the prisms.

6. Holographic projection system according to claim 4 where the first optical deflection means is a prism array with micro prisms, where each matrix section is assigned with a multitude of micro prisms, which direct the partial light waves in a step-like manner according to the structure of the spatial frequency filter.

7. Holographic projection system according to claim 1 where the spatial frequency filter is an aperture mask with apertures each of which letting pass a single diffraction order of the modulated partial light wave.

8. Holographic projection system according to claim 7 where the aperture mask comprises step-like offset transparent areas, which have a shape and position that corresponds to the shape and position of the same diffraction orders in the focal plane.

9. Holographic projection system according to claim 1 where the second optical deflection means also are a prism array with prisms which lie in the optical path of the filtered modulated partial light waves, and which string together the step-like offset filtered partial light waves in one dimension so to form a wave front strip.

10. Holographic projection system according to claim 9 where the prism array comprises micro-prisms.

11. Holographic projection system according to claim 10 where the angular range of the micro-prisms is adjustable, and where each matrix section is assigned with a multitude of micro-prisms, which are controlled by an eye finder such that the wave front strips with their partial light waves are directed in accordance with an eye position.

12. Holographic projection system according to claim 11 where a tracking device controls the adjustable micro-prisms such that the partial light waves follow the movements of the eye positions of observer eyes.

13. Holographic projection system according to claim 9 where the second optical deflection means are prisms which are attached to the spatial frequency filter.

14. Holographic projection system according to claim 9 where the second optical deflection means are an array of mirror elements which are inclined in different directions.

15. Holographic projection system according to claim 1 where the adjustable third optical deflection means are discretely movable mirror means.

16. Holographic projection system according to claim 1 where the adjustable third optical deflection means are adjustable micro-prisms.

17. Holographic projection system according to claim 16 where the time division multiplex controller is connected with a tracking device, which controls the third optical deflection means such that the partial light waves follow the movements of the eye positions of observer eyes.

18. Holographic projection system according to claim 1 where the optical focussing means have different focal planes in the horizontal and in the vertical direction.

19. Holographic projection system according to claim 18 where a focal plane of the optical focussing means is disposed as close as possible to the spatial frequency filter, such that a Fourier transform of the partial light waves appears on the spatial frequency filter in the direction of deflection of the first deflection means.

20. Holographic projection system according to claim 18 where the second focal plane lies such that the focussing means vertically image the illuminated modulator cell matrix onto the second deflection means.

21. Holographic projection system according to claim 18 where the focussing means have a focal length $f_x$ in one direction, and where they are disposed at that distance $f_x$ behind the light modulator means.

22. Holographic projection system according to claim 21 where the focussing means have the focal length $f_y$ in the other direction, where $f_y = f_x/2$, and where the distances between the light modulator means and focussing means, and between the focussing means and the spatial frequency filter are both $2f_y$.

23. Holographic projection system according to claim 1 where the light modulator means are encoded with a synthetic, computer-generated hologram which reconstructs a structure of virtual light sources, and where the second deflection means are a one-dimensional diffuser which compensates the step-like offset of the partial light waves.

24. Holographic projection system according to claim 23, characterised in that it serves in a projection system for three-dimensional image representation as a backlight in order to realise virtual light sources for illuminating spatial light modulator means.

* * * * *